Figures 1, 2:
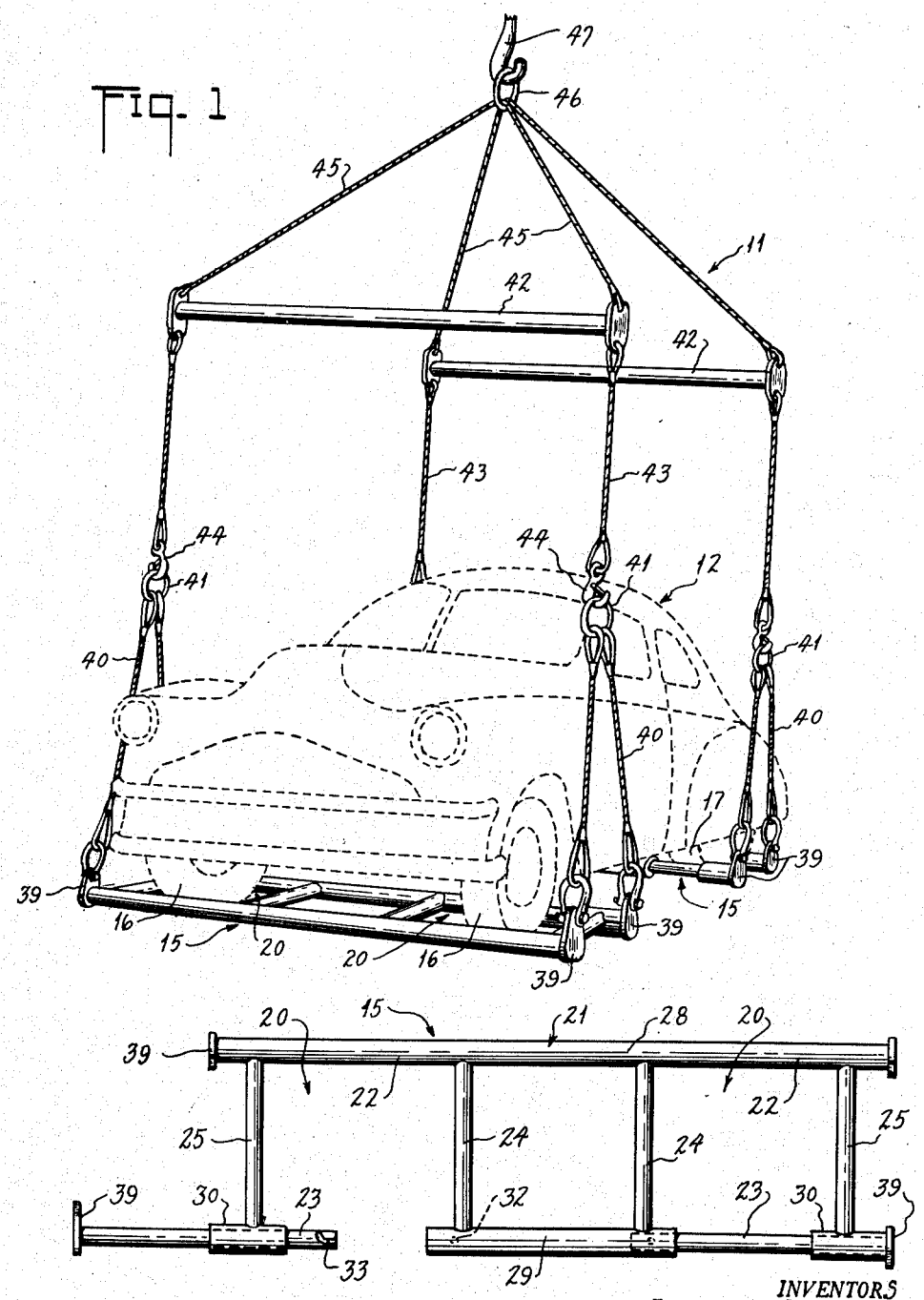

Dec. 31, 1957   J. J. BRENNAN ET AL   2,818,296
HOISTING SUPPORT FOR AUTOMOTIVE VEHICLES AND THE LIKE
Filed April 7, 1953                    2 Sheets-Sheet 1

INVENTORS
James J. Brennan
Michael Toscano
BY
ATTORNEYS

Dec. 31, 1957   J. J. BRENNAN ET AL   2,818,296
HOISTING SUPPORT FOR AUTOMOTIVE VEHICLES AND THE LIKE
Filed April 7, 1953   2 Sheets-Sheet 2
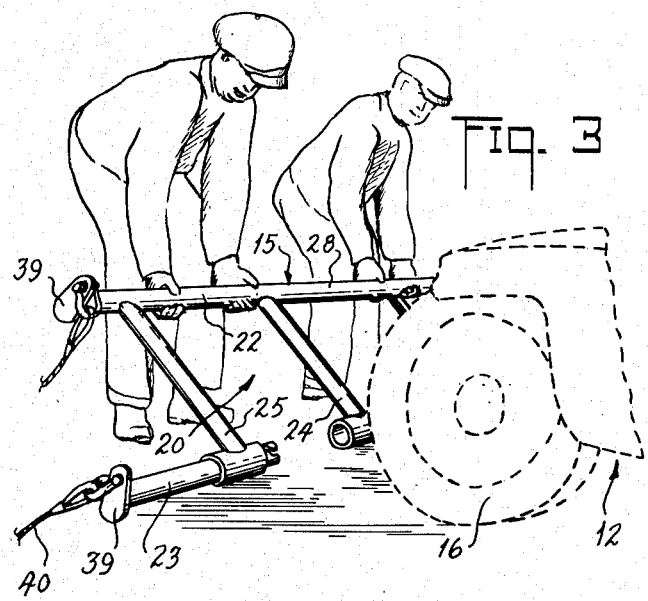
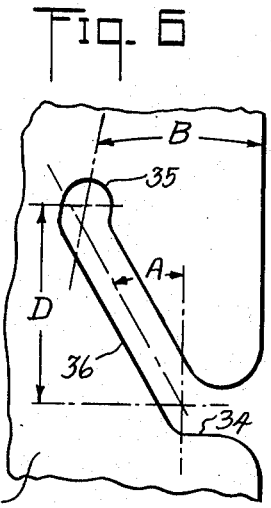
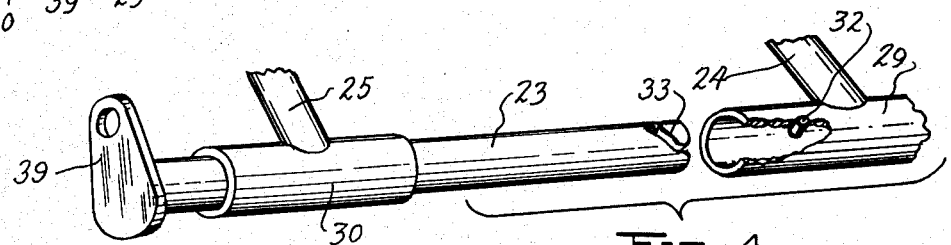
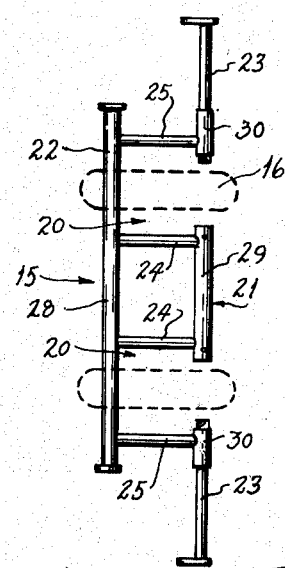
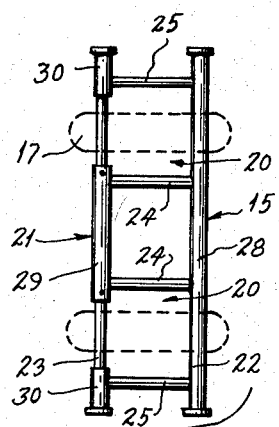
INVENTORS.
James J. Brennan
Michael Toscano
BY
ATTORNEYS United States Patent Office 2,818,296
Patented Dec. 31, 1957

2,818,296
HOISTING SUPPORT FOR AUTOMOTIVE VEHICLES AND THE LIKE

James J. Brennan, Hot Springs, Ark., and Michael Toscano, East Orange, N. J., assignors to the United States of America as represented by the Secretary of the Navy Application April 7, 1953, Serial No. 347,419
4 Claims. (Cl. 294—67)
(Granted under Title 35, U. S. Code (1952), sec. 266)

The present invention pertains to the art of stowing automotive vehicles and the like apparatus for shipping, and comprises a hoisting support for a vehicle being lifted.

The hoisting support of the present invention comprises a cradle for each of the sets of wheels of the vehicle, front and rear.

The structure of the cradles enables them to be positioned under, and moved from under, the wheels of a standing vehicle quickly and easily, thus eliminating the necessity of manually rolling the vehicle onto or off of its hoisting device as is required under prior art practice. The cradles are constructed particularly for easy use when the vehicle is located in a closely confined space.

Each cradle comprises a set of boxes or receptacles, one receptacle for each wheel of a set of adjacent wheels, which are received and engaged or held by the several receptacles of a set. The receptacles can be opened or closed alternatively, and are opened to position a cradle into or out of engagement with its set of wheels. The receptacles in closed condition engage the wheels from below, and are closed when the cradle is lifted to hoist the vehicle.

The receptacles of each cradle are rigidly contained in a rigid frame which extends far enough beyond opposite sides of the vehicle to hold the slings that hang down from the hoising bridle out of contact with the vehicle. The receptacles are the only components of the entire hoisting device that engage the vehicle while it is being raised, lowered or moved, and this contact is under the tires of the wheels. All the rest of the hoisting device is held securely away from any portion of the vehicle.

The closure for each receptacle includes a latch, which is in position for latching engagement when the cradle is positioned under the wheels of the vehicle. When the receptacles are closed, the latch engages, and when the hoisting power is applied for the load to be lifted, the latch moves into locked position, which prevents the latch from opening inadvertently and secures the load against falling. When the vehicle is placed in its stowage position, and the hoisting power is released, the latch of the receptacle closure is free to move out of latching position.

The principles of the invention, and one practical embodiment thereof, is disclosed in the accompanying drawing, in which Fig. 1 is a perspective showing a hoisting device embodying the invention, Fig. 2 is a face view looking at a cradle that embodies the invention, Fig. 3 is a perspective that illustrates the operation of positioning the cradle of Fig. 2 under the wheels of a vehicle, Fig. 4 is a fragmentary perspective of a detail of the invention, Fig. 5 is a plan illustrating cradles of the invention positioned for engaging the wheels of a vehicle, and Fig. 6 is a developed view illustrating the latching detail.

A hoisting device embodying the present invention comprises a hoisting bridle, illustrated generally at 11 in Fig. 1, which supports an automotive vehicle, illustrated generally at 12, while the vehicle is being hoisted onto or off of a ship, for example, from or to an adjacent dock. A set of cradles, illustrated generally at 15 are suspended from the hoisting bridle 11, there being a cradle 15 for each set of adjacent wheels of the vehicle 12. Accordingly as shown, there is a cradle 15 for each set of front and rear wheels, 16 and 17 respectively, of vehicle 12. In the structure of the disclosure, both cradles 15 are the same, and each is adapted to be positioned under adjacent front wheels 16 or adjacent rear wheels 17 selectively.

Each cradle comprises a receptacle 20 for each of the set of wheels, 16 or 17 alternatively, and comprises a rigid frame 21 secured rigidly to the receptacles 20, the frame also securing the receptacles rigidly to each other. See Fig. 5 particularly.

Each receptacle 20 comprises opposite end rails 22 and 23, and a pair of side rails 24 and 25, the side and end rails being secured to each other at their several ends to border the area of the receptacle. Side rails 24 and 25 are respectively inner and outer with reference to the length of the frame 21, and widthwise with reference to a vehicle supported by cradles 15.

End rails 22 and 23 are held in the frame 21 and are spaced apart a distance that is less than the diameter of any of the wheels 16 or 17 of the automotive vehicle, but the end rails are far enough apart to be positionable under a tire in front of and back of a wheel 16 or 17 when the vehicle is resting on a surface. Thus, when the cradles 15 are raised, each receptacle 20 engages its corresponding wheel 16 or 17 of the vehicle 12 from below the tire. The vehicle 12 therefore may be lifted by the cradles 15 rising from underneath with the tire of each wheel 16 contained and held in a receptacle 20, as seen in Fig. 1.

The distance between end rails 22 and 23 of any receptacle 20 may vary within wide limits without departing from the scope of the invention, and the rails are spaced apart a distance that will adapt the receptacles 20 to engage wheels 16 or 17 of any of the sizes within the range of sizes that occur in the automotive industry. Likewise, the distance between side rails 24 and 25 of any receptacle 20 may vary within wide limits. Side rails 24 and 25 are spaced apart a greater distance than the width of an automotive wheel 16 or 17, being spaced apart far enough to accommodate any size of wheel that may occur in the automotive industry.

According to preferred structure, cradles 15 are made of pipe, and their several components constitute each a length of pipe.

Frame 21 comprises a long pipe length 28 that is long enough to extend throughout the length of cradle 15. Frame 21 also comprises a shorter pipe length 29, which spans the distance between inner side rails 24 of adjacent receptacles 20 in cradle 15. Each inside side rail 24 constitutes a length of pipe which is rigidly secured at its opposite ends to the respective longer and shorter pipe lengths 28 and 29 of the frame. Thus, each inside side rail 24 of the receptacles 20 also serves the purpose of, and constitutes, a cross rail for the frame 21. The distance between inside side rails 24 may vary within wide limits, and is determined to be small enough to fit between adjacent wheels of a vehicle, the distance between rails 24 being selected to apply cradle 15 to a vehicle of any wheel gauge that occurs in the automotive industry. The distance in any receptacle 20 between inside and outside side rails 24 and 25 also is determined to meet wheel-gauge differences that occur in automotive vehicles.

The two portions of long pipe length 28 that extend beyond the two inside side rails 24 of receptacles 20 to the ends of cradle 15 also serve the additional purpose each of an end rail 22 of a corresponding receptacle 20, whereby end rails 22 and receptacles 20 are rigidly secured to each other and to the frame 21.

The opposite end rail 23 of each receptacle 20 is movable alternatively into or out of its end position in the receptacle, and thus constitutes a closure for the receptacle. Receptacles 20 of a cradle 15 are opened by their end rails 23 being moved out of their end positions, and this is done whenever cradle 15 is either positioned under, or removed from under, a vehicle 12. Thus, the cradles 15 are moved to the vehicle 12, and it is not necessary to move the vehicle 12 onto or off of the several front and rear cradles 15 before or after hoisting the vehicle.

The outer side rail 25 of each of the receptacles 20 is secured as shown at its one end to the long pipe length 28 of the frame 21 at or near the end thereof and the end of cradle 15. Each outside rail 25 extends away from its attachment to the long pipe length 28 parallel with inner rail 24 to a position in line with shorter pipe length 29. Guideway 30 is secured at the end of rail 23 remote from pipe length 28, and is directed towards the shorter pipe length 29 of frame 21. End rail 23 is movable along the guideway alternatively into or out of engagement with pipe length 29 of frame 21, thereby to close or open the receptacle 20 alternatively. The end rail 23 of each receptacle 20 also constitutes a length of pipe, the size of which is smaller than the pipe length 29 and pipe 23 fits into pipe 29. Guideway 30 is cylindrical and serves as a bearing in which the end rail 23 may rotate.

A latch is provided for each receptacle 20 to hold it locked in closed condition while a vehicle is being hoisted. In the disclosed embodiment, the latch comprises a pin 32, Fig. 4, that projects downwardly and radially inside pipe 29, and end rail 23 comprises a companion slot 33 into which the pin 35 slides when the end rail 23 is actuated into pipe 29 to close the corresponding receptacle 20.

Slot 33 comprises a throat 34 which is at the end of the pipe of end rail 23 and a locking recess 35 at the end of the slot remote from the end throat. Between throat 34 and locking recess 35, slot 33 comprises an helical path for the pin 35.

Hoisting bridle 11 is shackled to its cradles 15 in any suitable manner. In the disclosed structure of Fig. 1, one or more shackle eyes 39 are secured at each end of a cradle, to which a sling 40 is shackled. A sling 40 comprises two lines or cable, secured to ring 41, and hangs from the end of the spreader bar 42 by means of line or cable 43 with the hook 44 at its end to engage the ring 41. As seen in Figs. 2 and 3, a shackle eye 39 is secured rigidly to each end of long pipe length 28 of cradle 15, in position to project upwardly when cradle 15 rests on a flat surface. A like shackle eye 39 is secured rigidly to each end rail 23 at its corresponding end of the cradle. The two cables of sling 40 are secured respectively to the shackle eyes 39 at an end of cradle 15, as seen in Fig. 1.

A sling 40 is secured to each end of each cradle 15, and to each end of a spreader bar 42. Each spreader bar 42 is about the same length as the cradles 15, which are long enough to extend beyond the extreme side surfaces of vehicle 12. Therefore, the sling suspension hanging from each end of a spreader bar 42, and comprising cable 43, hook 44, and the sling 40 consisting of a ring 41 and its two cable lengths, is held well away from contact with vehicle 12 by being taut between the rigid frame 21 of cradle 15 and the spreader bar 42. The only contact with the automotive vehicle 12 during hoisting is by the two cradles 15 against the respective front and rear wheels 16 and 17, and this contact is upwardly from below the tires.

Other details of the hoisting bridle 11 may vary in accordance with a particular hoisting operation, the suspension shown in Fig. 1 being one typical example. A spreader bar 42 is provided for each cradle 15, which support the vehicle at its respective front and rear wheels 16 and 17. A cable 45 from each end of each spreader bar 42 is connected to the ring 46 that is common to all. Hook 47 engages ring 46 and carries the entire load.

When a cradle 15 rests on a flat surface, such as the deck of a ship, the shackle eye 39 of pipe length 28 projects upwardly. End rail 23 rotates in its bearing of guideway 30 until the shackle eye 39 of rail 23 bears on the deck. This positions the throat 34 of slot 33 in line with pin 32, and the slot 33 thus is located circumferentially of the pipe of end rail 23 for the pin 32 to enter the slot 33 when end rail 23 is inserted into the shorter pipe length 29.

As the pipe length of end rail 23 continues to be inserted deeper into pipe length 29, pin 32 travels along helical path 36, and pipe 23 is rotated accordingly in the bearing of its guideway 30. This brings the shackle eye 39 at the end of end rail 23 into upright position, and when tension is applied to the hoisting bridge 11 for lifting vehicle 12, shackle eye 39 of rail 23 swings to a position that seats the pin 32 into the locking recess 35.

The magnitude of arcuate displacement between the throat 34 and locking recess 35 is determined accordingly and is about a quarter turn, and the angle of helical path 39 is determined also for accomplishing the described locking action. An angle A of about 30° has been found suitable for the helix of path 36. The angular distance a shackle eye 39 of end rail 23 swings from its position of rest on the deck to its position of tension under load is indicated by distance D in Fig. 6. Locking recess 35 is disposed at a reentrant angle with reference to angle A, as indicated by angle B in Fig. 6. Angle B of approximately 10° operates satisfactorily to insure against pin 32 escaping from slot 33 when a vehicle 12 is being lifted.

To attach the hoisting device of the present invention to a vehicle 12 to be lifted, a cradle 15 is projected under the vehicle at the front, as seen in Fig. 3, until each of the front wheels 16 is positioned in a receptacle 20 of the cradle 15 as seen in Fig. 5. This is done with the receptacles 20 in opened condition as seen at the left in Fig. 5 by the movable end rails 23 being withdrawn from pipe length 29 and retracted lengthwise in their guideways 30.

A like cradle 15 is positioned under the rear wheels 17 of the vehicle in a similar manner, with a wheel 17 in each of the receptacles 20 of the cradle. Now all the receptacles 20 are closed by projecting each end rail 23 along its guideway 30 and into their corresponding ends of shorter pipe length 29. By this movement of each guide rail 23, its corresponding pin 32 enters the throat 34 of slot 33, travels along helical path 36, and becomes lodged in its locking recess 35. Now a closed receptacle 20 is positioned under each of the wheels 16 and 17. When the vehicle 12 is lifted, the applied tension holds each pin 32 firmly seated in its locking recess 35.

To remove the cradles 15, their receptacles 20 are opened by retracting their movable end rails 23, and the cradles 15 are then withdrawn from under the wheels. It will be observed that each pin 32 slides out of its slot 33 by its end rail 23 being retracted.

The disclosure of the drawing presents one practical embodiment of the invention.

The invention described herein may be manufactured and used by or for the Government of the United States of America for governmental purposes without the payment of any royalties thereon or therefor.

We claim:

1. In a cradle for a hoisting bridle and slings constituting apparatus for hoisting an automotive vehicle or the like, a receptacle for each of adjacent two wheels of the vehicle and a rigid frame secured rigidly to the receptacles, each receptacle comprising a pair of end rails and a pair of side rails secured to each other at their ends to border the area of the receptacle, the end rails being spaced apart far enough to fit under a wheel of the vehicle resting on a surface in front and in back respectively and being spaced apart a distance less than the diameter of the wheel, the pair of side rails being spaced apart a distance greater than the width of a wheel of the vehicle, one end rail being movable alternatively into and out of its end position to constitute a closure for the receptacle, the frame holding the several receptacles relatively positioned respectively to engage adjacent wheels of the vehicle, shackles secured at the ends of the rigid frame and adapted to engage slings of a hoisting bridle, the distance between opposite end shackles being greater than the overall width of an automotive vehicle.

2. In a cradle as defined in claim 1, the frame comprising a long pipe length coextensive with the length of the frame and a shorter pipe length spanning the distance between the receptacles, the side rail of each receptacle inside with reference to the vehicle being secured at its respective opposite ends to the longer and shorter pipe lengths to constitute a cross rail of the frame, the outside side rail of each receptacle being secured at its one end to the longer pipe length and at its opposite end comprising a guideway in line with the shorter pipe length, each portion of the long pipe length that extends between side rails of the receptacle constituting a rigid end rail of the receptacle, the movable end rail of a receptacle being slidable along the guideway into and out of engagement with the shorter pipe length to close or open the receptacle alternatively.

3. In a cradle as defined in claim 2, the movable end rail of each receptacle constituting a length of pipe of smaller size to fit in the shorter pipe length of the frame, the guideway being cylindrical to constitute a bearing for the pipe, and a latch between the shorter pipe length of the frame and each movable end rail to hold the end rail in its end position of the receptacle.

4. In a cradle as defined in claim 3, each latch comprising a pin projecting inwardly of the shorter pipe length and a companion slot extending lengthwise of the pipe length of the movable end rail, the slot comprising a throat at the end of its pipe length, a locking recess remote from the end of the pipe length and a helical path for the pin between the throat and the lock, the lock comprising the slot extended in a direction reentrant from the angle of the helical path, one of the shackles being rigidly secured to the end of each end rail that corresponds with the end of the cradle, the circumferential distance between the throat and locking recess of the slot corresponding with the angular displacement of the shackle with its end rail between the cradle resting on a surface and the cradle in load-supporting position.

References Cited in the file of this patent

UNITED STATES PATENTS 2,593,664     Fearfield et al. ---------- Apr. 22, 1952

FOREIGN PATENTS 672,786     Great Britain ---------- May 28, 1952